United States Patent
Moll

(10) Patent No.: US 10,922,658 B2
(45) Date of Patent: Feb. 16, 2021

(54) TALENT RECRUITMENT SYSTEM AND METHOD

(71) Applicant: Bryan Moll, New York, NY (US)

(72) Inventor: Bryan Moll, New York, NY (US)

( * ) Notice: Subject to any disclaimer, the term of this patent is extended or adjusted under 35 U.S.C. 154(b) by 931 days.

(21) Appl. No.: 15/072,328

(22) Filed: Mar. 16, 2016

(65) Prior Publication Data

US 2016/0275455 A1 Sep. 22, 2016

Related U.S. Application Data

(60) Provisional application No. 62/133,923, filed on Mar. 16, 2015.

(51) Int. Cl.
| | |
|---|---|
| *G06Q 10/10* | (2012.01) |
| *G06Q 10/06* | (2012.01) |
| *G06Q 30/08* | (2012.01) |
| *G06Q 30/02* | (2012.01) |
| *G06Q 10/00* | (2012.01) |
| *G06Q 50/00* | (2012.01) |

(52) U.S. Cl.
CPC ......... *G06Q 10/1053* (2013.01); *G06Q 50/01* (2013.01); *G06Q 10/105* (2013.01)

(58) Field of Classification Search
CPC ... G06Q 10/1053; G06Q 10/105; G06Q 50/01
USPC .......................... 705/1.1–912, 319, 320, 321
See application file for complete search history.

(56) References Cited

U.S. PATENT DOCUMENTS

| | | | |
|---|---|---|---|
| 8,504,559 B1 | 8/2013 | Elman et al. | |
| 8,572,000 B1* | 10/2013 | Weingarten | G06Q 10/1053 705/320 |
| 8,639,633 B2 | 1/2014 | Schneider | |
| 2013/0325734 A1* | 12/2013 | Bixler | G06Q 10/1053 705/321 |
| 2015/0127565 A1* | 5/2015 | Chevalier | G06Q 10/00 705/319 |
| 2015/0186847 A1* | 7/2015 | Menon | G06Q 10/1053 705/321 |
| 2015/0235181 A1* | 8/2015 | Chen | G06Q 10/1053 705/321 |
| 2015/0302359 A1 | 10/2015 | Krishnamoorthy et al. | |

(Continued)

*Primary Examiner* — Jonathan P Ouellette
(74) *Attorney, Agent, or Firm* — Nwamu, P.C.

(57) ABSTRACT

A talent recruitment system and method. The system and method stores a first vacancy profile that includes a trackable link. This first vacancy profile may be from a first opportunity provider. An electronic campaign directed at opportunity seekers that are interested in being potential matches for the single vacancy profile is initiated. A candidate profile for a potential candidate is generated and a matching algorithm to determine if the candidate profile and the first vacancy profile are correlated is executed. If no correlation exists, it is determined whether to seek correlation between the candidate profile and a second vacancy profile from a second opportunity provider. If correlation between the candidate profile and the second vacancy profile is authorized, the matching algorithm is executed to determine correlation between the candidate profile and the second vacancy profile. If a correlation is found, the candidate is notified that a match exists. An award may also be provided to the first opportunity provider on behalf of the second opportunity provider.

12 Claims, 8 Drawing Sheets

(56) References Cited

U.S. PATENT DOCUMENTS

2016/0162840 A1* 6/2016 Roberts .............. G06Q 10/1053
705/321

* cited by examiner

600 →

John J. Johnson ─╱─602
761 Middlefield Ave ⎫
Menlo Park, CA    ⎬─604
(650) 123-4567 - Home
John@gmail.com - Email

EXPERIENCE ─╱─606

2012-2016   FACEBOOK, INC. ─╱─608              Software Engineer ─╱─609
Menlo Park, CA
- Developed software programs that allowed easier access to information.
- C+, HTML, PhP ─╲─610
- .....
- .....
- .....

EDUCATION ─╱─612

May 1998   STANFORD UNIVERSITY ─╱─614          Stanford, CA
BS Electrical Engineering ─╱─616
.......
.......
.......
.......

INTERESTS / PUBLIC INTEREST ─╱─618
- Board Member - YTA (Youth Tennis Advantage) ─╱─620
- .....
- .....

622 →   Yes  ☒  Correlate profile with secondary
                Databases?
        No   ☐

Jane D. Doe ⟵702
2 Pine St
San Francisco, CA ⟵704
(415)123-4567-Home
Jane@gmail.com-Email

EXPERIENCE ⟵706

2007-2016  TWITTER, INC. ⟵708                    Software Engineer ⟵709
           San Francisco, CA
   • Embedded real time software development.
   • C, C++, Java ⟵710
   • .....
   • .....
   • .....

EDUCATION ⟵712

May 1998  San Francisco State University ⟵714        Stanford, CA
          BS Computer Science ⟵716
          .......
          .......
          .......
          .......

INTERESTS ⟵718
   • Computing Internet of Things Club ⟵720
   • ......
   • ......

622 ⟶  Yes ☒  Correlate profile with secondary Databases?
        No  ☐

Dave D. Davidson ⟵ 802
2 Broadway ⟵ 804
New York, NY
(212)555-1212-Home
Dave@gmail.com-Email

EXPERIENCE ⟵ 806

2009-2016  COMPUTING, INC. ⟵ 808          Software Engineer ⟵ 809
San Francisco, CA

- PhP, C, C++, Java, AJAX, HTML, Ruby, XML ⟵ 810
- Cryptography Expert
- .....
- .....

EDUCATION ⟵ 812

May 1998  Columbia University ⟵ 814          Stanford, CA
BS Electrical Engineering ⟵ 816
.......
.......
.......
.......

INTERESTS ⟵ 818

- Cryptography Club ⟵ 820
- ......
- ......

622 ⟶  Yes ☒  Correlate profile with secondary Databases?
No ☐

*FIG. 8*

TALENT RECRUITMENT SYSTEM AND METHOD

BACKGROUND OF THE INVENTION

The present invention relates generally to a recruitment system, apparatus and method and more specifically to a recruitment system, apparatus and method for recruiting talent during a recruitment process.

When recruiting, companies/organizations expend considerable effort to attract talented individuals ('talent') in order to provide the largest possible pool of talent from which to choose the most suitable individual or individuals for a particular role or roles. Common methods of recruiting or raising awareness of vacancies include advertising in print or online, or outsourcing the process to a specialist recruitment firm. The recruiting processes have been developed and refined further since the use of social media and digital databases became commonplace and widespread.

The typical end goal of the process is to fill the vacant position or positions within the company/organization, by making a job offer that will be accepted by an individual or individuals. As noted above, companies and organizations will attempt to optimize this process largely by attracting as much talent as possible into a talent pool from which they can choose the most suitable candidate(s), although different methodologies have been developed to improve on or finesse this process. Often, the attracted candidates will be the candidates that are actively seeking employment.

Generally speaking, once a suitable individual or individuals have been recruited, and a particular vacant position has been filled, a company or organization will typically communicate with the non-selected candidates informing such candidates that their names will be retained in an internal database for use in the event that a new role becomes available. Thereafter, the non-selected candidates will often continue their search for other vacant opportunities by, for example, creating additional individual profiles in additional databases associated with vacant opportunities.

It is within the aforementioned context that a need for the present invention has arisen. Thus, there is a need to address one or more of the foregoing disadvantages of conventional systems and methods, and the present invention meets this need.

BRIEF SUMMARY OF THE INVENTION

Various aspects of a talent recruitment system and method can be found in exemplary embodiments of the present invention.

In one embodiment, the talent recruitment system and apparatus method uses one or more processors to convert non-selected talent profiles, where conversion is based on candidate information received for a first vacant position.

In an alternate embodiment, a talent recruitment system and method is disclosed. The talent recruitment system and method stores a first vacancy profile that includes an opportunity seeker track-able link. The first vacancy profile itself may be associated with a first opportunity provider. Then, an electronic campaign directed at opportunity seekers that are interested in being potential matches for the single vacancy profile is initiated. Thereafter, a candidate profile for a potential candidate is generated and a matching algorithm to determine if the candidate profile and the first vacancy profile are correlated is executed. If no correlation exists, a determination is made whether to seek correlation between the candidate profile and a second vacancy profile from a second opportunity provider. If correlation between the candidate profile and the second vacancy profile is authorized, the matching algorithm is executed to determine correlation between the candidate profile and the second vacancy profile. If a correlation is found, the candidate is notified that a match exists. An award may also be provided to the first opportunity provider. The award might be on behalf of the second opportunity provider.

In one embodiment, the method includes employing one or more servers, to store in a data store, a data object that includes a first vacancy profile from a first opportunity provider, wherein the first vacancy profile includes a trackable link that tags one or more opportunity seekers; by the one or more servers, initiating an electronic campaign directed to one or more opportunity seekers including at least one candidate identified as potential match for the single vacancy profile; by the one or more servers, generating and storing in the data store, based on a response by the at least one candidate to the electronic campaign, a candidate profile for the at least one potential candidate.

The method further includes by the one or more servers, executing a matching algorithm to determine if the candidate profile and the first vacancy profile of the first opportunity provider are correlated, and wherein if no correlation exists, by the one or more servers, determining whether to seek correlation between the candidate profile and a second vacancy profile that is associated with a second opportunity provider, wherein the second opportunity provider is an entity that is different from the first opportunity provider and that would otherwise have no access to the at least one potential candidate; by one or more servers, if it is determined to seek correlation between the candidate profile and the second vacancy profile, executing the matching algorithm to determine correlation between the candidate profile and the second vacancy profile; and by one or more servers, if a correlation is found, notifying the at least one candidate that although a match does not exist between the candidate profile and the first vacancy profile, that a match exists between the candidate profile and the second vacancy profile.

In an embodiment, the determining whether to seek correlation is based on consent received from the opportunity seeker. In another embodiment, the consent is received via a flag set in the candidate profile. The consent may also be received via an electronic message.

In an embodiment, the method provides the first opportunity provider with an award based on the match between the candidate profile and the second vacancy profile. In an embodiment, the method by the one or more servers, generates and stores based on a response by a second opportunity seeker to the electronic campaign, a second candidate profile that is associated with said second opportunity seeker; by the one or more servers, executes a matching algorithm to determine if the second candidate profile and the first vacancy profile are correlated, and wherein if no correlation exists, determining whether to seek correlation between the second candidate profile and the second vacancy profile; by the one or more servers, if seeking correlation between the second candidate profile and the second vacancy profile is authorized, executing the matching algorithm to determine said correlation between the second candidate profile and the second vacancy profile; and by the one or more servers, if a correlation is found, ranking each of the first candidate profile and the second candidate profile based on a level of correlation that the first candidate profile and the second candidate profile has with the second vacancy profile.

In an embodiment, the method comprises by the one or more servers, generating and storing based on a response by a second opportunity seeker to the electronic campaign, a second candidate profile that is associated with said second opportunity seeker; by the one or more servers, determining that a correlation exists between the second candidate profile and the first vacancy profile, and between the first candidate profile and the first vacancy profile; and ranking each of the first candidate profile and the second candidate profile based on a level of correlation that the first candidate profile and the second candidate profile has with the first vacancy profile.

In another embodiment, a computer system comprising a memory device; and a processor in communication with the memory device, wherein the memory device comprises instructions that when executed by the processor cause the processor to: store a data object that includes a first vacancy profile from a first opportunity provider, wherein the first vacancy profile includes a track-able link that tags one or more opportunity seekers; initiate an electronic campaign directed to one or more opportunity seekers including at least one candidate identified as potential match for the single vacancy profile; generate and store, based on a response by the at least one candidate to the electronic campaign, a candidate profile for the at least one potential candidate; execute a matching algorithm to determine if the candidate profile and the first vacancy profile of the first opportunity provider are correlated, and wherein if no correlation exists, determine whether to seek correlation between the candidate profile and a second vacancy profile that is associated with a second opportunity provider, wherein the second opportunity provider is an entity that is different from the first opportunity provider; if it is determined to seek correlation between the candidate profile and the second vacancy profile, execute the matching algorithm to determine correlation between the candidate profile and the second vacancy profile; and if a correlation is found, notify at least one candidate that although a match does not exist between the candidate profile and the first vacancy profile, that a match exists between the candidate profile and the second vacancy profile.

Additional embodiments and a further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 6 illustrates a candidate profile according to an exemplary embodiment of the present invention.

FIG. 7 illustrates another candidate profile according to an exemplary embodiment of the present invention.

FIG. 8 illustrates a candidate profile according to an exemplary embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

System Overview

Figure 1:
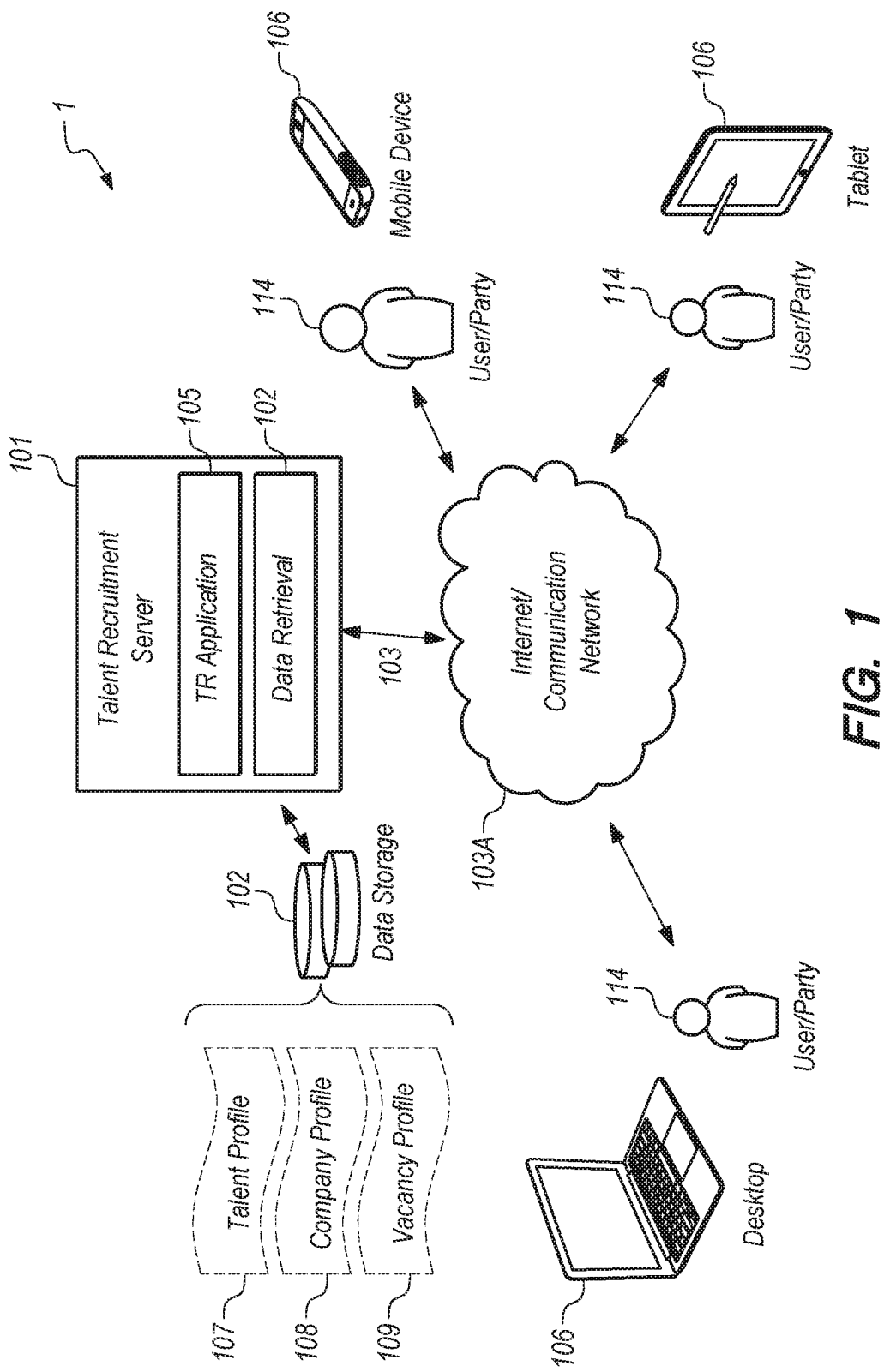
FIG. 1 shows a schematic overview of the architecture of a talent recruitment system suitable for implementing an embodiment of the present invention, with the main building blocks or system elements and the main connections between these elements shown.

A schematic overview of the architecture of a talent recruitment system 1 suitable for implementing the preferred embodiments is shown in FIG. 1, with the main building blocks or system elements and the main connections between these elements shown.

The talent recruitment system has a talent recruitment server 101, which consists of interconnected and intercommunicating key elements as follows: a data store 102, which can be a server, an enterprise data warehouse, an operational data store, a data mart, a storage array, or similar; a data retrieval engine 104, which is in communication with the data store 102 to enable the stored data to be retrieved and transferred to other elements of the system, and; a processing module 105 that is in communication with the data retrieval engine 104 to receive the data and process this as outlined below.

The data store 102 may also at least partly be a cache memory used to temporarily store incoming data captured in real time—for example streaming data. The data store 102 may also be a centralized location, or a distributed network. Data stored in the data store 102 at least partly relates to individual candidate profiles 107, company/organisation profiles 108, job vacancies or job profiles 109, etc.

For example, an individual user profile 107 will generally contain details of the individuals educational achievements, job experience, age, geographical location and other relevant details. A company profile 108 will include information on the area of industry, the size of the company, the geographical location or location of relevant sites. A job profile 109 will include details of skills and education required, geographical location, and so on.

The talent recruitment server 101 is in communication with multiple terminals 106 to receive and store data. The terminals 106 may be widely geographically separated. Data is entered into the data store 102 by an authorised user logging on to the system via a user terminal.

The data can be sent to the data store 102 from the terminals or sources 106 by way of any suitable communication system 103—for example, wireless transmission, transmission via an established telephone network (mobile or landline), via a built-in hardwired grid, etc. If the terminals 106 are geographically separated from the data store 102 by longer distances, then a combination of these elements may be used to transmit and receive the data. The terminals or sources may also be coupled to talent recruitment server 101 via Internet/Communication network 103A, which might be any wired or wireless network that allows data transfer from point to point.

Generally, the terminal or terminals 106 are in communication with, but do not form part of, the core portion 101 of the system. The terminals 106 may be employee terminals that are used to add, remove and amend data relating to a company/organisation profile, or to add, remove and amend data relating to a vacancy or vacancies.

The terminals 106 may also be a user terminal or terminals. The terminal 106 by which a user connects with the system also does not necessarily form part of the core portion of the system, and is mostly likely to be their own personal terminal: for example a laptop, PDA/tablet device, mobile or smartphone, or desktop PC.

As outlined above, the data held in the data store 102 consists at least partly of individual talent profiles 107, company/organization profiles 108, job vacancy profiles 109, and other associated data that in aggregate forms a talent network or talent community 111. That is, the talent community or talent network 111 comprises a number of aggregated individual users and organisations, the individual users and organisations at least partly interlinked or cross-linked.

Further details of the talent community 111 and the inter-linkages will be further outlined below.

Talent Profile

An individual user joins the talent community or talent network 111 by creating a talent profile 107. The initial step of joining the talent community or talent network 111 can be an independent decision to join made by an individual, or this could be prompted by receipt of an invitation to join the community 111. For example an existing member (either an individual owner of a talent profile 107, or the owner of an organisation profile 108) can send an invitation to a non-member. This can be sent via an e-mail that is generated by a sub-routine or application within the talent recruitment server 101 on request.

Creation of a talent profile 107 is achieved by connecting with the network (the data store 102) via a user terminal 106. In one embodiment, a user uses a data object such as an XML form to enter their details on a website, or similar interface. Users enter their details as required to populate the profile: education, job experience, age, location, contact details, etc. In another embodiment, the user may employ a data object such as a text file that includes the user's resume. Other contemplated data object types that include candidate data may be PDF files, etc. Thereafter, the details of the talent profile 107 are stored in the data store 102 as part of the larger talent pool or network 111, which comprises the aggregated talent profiles 107 of a number of users.

In another implementation, talent recruitment server 101 may obtain candidate data from publicly available sources. The process might include either manually obtaining information or automatic retrieval using such as web crawlers to obtain candidate and employer data from public sources such as LinkedIn, Facebook, jobsites, resume banks and the like.

Once a talent profile 107 is uploaded to the data store 102, in this embodiment, the final step is for the owner to agree that it can go 'live' within the larger talent pool or network 111 (e.g. by saving the profile and clicking 'yes' to agree to publication, or similar). The talent profile is now 'searchable' and forms part of the talent pool or network 111.

A user can also adjust the settings relating to the publication of their profile such that their information is fully hidden or non-searchable, or so that only a portion of their details or a 'skeleton' profile is published/publicly searchable. The skeleton profile could consist of details such as their full name and occupation, for example. Other details could be added by adjusting the settings, such as geographical location, experience, etc.

Organisations and Vacancies

In a similar manner, in general (other variations discussed below with reference to subsequent figures), member organisations are able to create company/organisation profiles 108 and vacancy/job profiles 109 within the data store 102 via terminal(s) 106 (profiles 108 and 109 known collectively as organisation-created profiles). These can be separate, or the vacancy profile(s) 109 can be associated with an organisation profile 108.

An organisation or vacancy profile can also be created without the need for a separate associated organisation or vacancy profile. The vacancy profiles 109 are used to attract talent towards the member organisations. A registration fee or similar may be associated with the creation of company/organisation profiles 108 and vacancy/job profiles 109 within the data store 102.

Talent Pool/Talent Community

It can be seen that the larger the talent pool or talent community 111, the larger the number of potential employees for a particular position, and also the larger the number of potential vacancies. An organisation or company can help to grow the community by public or semi-public/targeted advertising.

For example, an organisation can publicise an invitation to join the talent pool or talent community 111 on a trade website or in a trade journal, with a web address or a link included. An organization after considerable research can also identify candidates who are not in the job market but have been identified as being potentially suitable for a vacancy. A solicitation would then be sent to such a potential candidate to enter a profile.

Alternatively, the organisation could send an invitation to all, or a sub-set of, their mailing list (e.g. via e-mail). A potential talent profile owner who receives an invitation can click on the link, or can enter the address, in order to join the private talent community 111 by creating a talent profile 107 as outlined above. The invitation might also be directed to a particular identified individual soliciting that individual to respond to a particular job vacancy of the company.

The organisations/companies 108 within the pool 111 can also market or advertise via social media. An interested party clicks or follows a link to a job profile 109 to learn more/show interest/apply for the job. The individual will be required to create a talent profile 107 within the community 111 if they have not already done so (i.e. if they are not already a member of the community).

An example of an operation in accordance with an embodiment of the present invention will now be discussed.

As outlined above, the data retrieval engine 104 is in communication with the data store 102 to enable the stored data to be retrieved and transferred to other elements of the system. The processing module 105 is in communication with the data retrieval engine 104 to receive the data and process this as outlined below. The data retrieval engine 104 and processing module 105 are in communication with external inputs from an end user via the data sources or terminals 106.

The processing module 105 is set to automatically assess talent profiles 107 within the data store 102 and match these to job profiles 109 via keyword or key phrase matching. Newly created and newly published or newly 'live' profiles 107 are automatically assessed and matched to suitable current job profiles 109 via keyword or key phrase matching.

Similarly, newly created and newly published job profiles 109 are automatically assessed and matched to suitable current talent profiles 107 via keyword or key phrase matching. The match can be based on an 'exact criteria' match, or on a 'points' match—that is, various criteria can be weighted so as to 'score' a certain number of points, which may vary depending on the closeness of the match (e.g. 10 points for an exact match in relation to directly relevant experience or qualifications, 5 points if the profile shows a lesser qualification or less experience than is ideal).

If a talent profile 107 scores sufficient points in relation to these weighted criteria then it is overall considered to be suitable for further consideration. Other filters can also be created, for example geographical location. The results of the matching are by default private (that is, the processing module 105 does not automatically publicise the results of the matching process, or notify either the owner of the talent profile 107 or the owner organisation 108 of the job profile 109), although this setting can be changed so that the profile owner is automatically notified of new matches or results.

Each job (job profile 109) that the individual owner of the talent profile 107 is qualified for is a positive result. These results (a list of vacancies for which they are qualified) are provided back to the owner of the talent profile 107, for example as a list of results on a website homepage, as a list via e-mail, etc, the first time they search. Subsequent new matches can be notified to the owner automatically if desired. At this stage, the process is private. The owner of the talent profile 107 will be prompted to review the matched results generated by the process outlined above.

The next step is for the owner of the talent profile 107 to 'thumbs up' or 'like' the job vacancy profiles 109 in their results list which they consider worthy of further consideration. The 'thumbs up' or 'like' information is provided back to the companies/organisations that own the 'liked' job profiles 109. This can be achieved by prompting the owner of a talent profile 107 to click on an appropriate icon or link. The processing module 105 is set to send alerts to the job profile owner (e.g. a designated HR representative) on receipt of a 'like'.

Details of the talent profile or profiles 107 will only become visible, and (by default) only to a potential employer once the owner of the talent profile 107 'thumbs up' or 'likes' a job vacancy profile 109. This allows the owner of a talent profile to investigate vacancies, carry out research into a potential employer and the vacancy, and make decisions, without these activities being inadvertently made public.

This can be useful for individuals who may not wish their current employer to know that they are investigating vacancies elsewhere. The owner of a talent profile can choose to alter these default settings if they wish, so that more of their details and/or activities within the talent pool are public.

Further steps can then be taken by the company or organisation to hire the owner of the suitable talent profile or profiles 107 who have shown interest in a particular vacancy that they have 'liked'. For example, they can be contacted via a private message within the community (the private messaging system enabled by a sub-routine or application which forms part of the talent recruitment system 1), or via conventional e-mail, telephone, etc using the details they provided as part of the profile creation process. The owner of the talent profile or profiles 107 then goes through a suitable process in order to be hired by the employer member.

If there are multiple profiles for a single job, the attracted talent profiles 107 can be automatically ranked according to the skills/criteria set by the organisation, and may also be manually assessed either in parallel with this automatic ranking, or as a subsequent step. The organisation will finalise the recruitment process by contacting individuals who are suitable, carrying out interviews, and making employment offers, as outlined above.

It can be seen that there will be a potentially large number of attracted talent profiles 107 which are not 'converted' (i.e. employed) post-attraction or click-through, either because they aren't a suitable match for the particular job profile 109, or because there are other, more suitable candidates also interested in the job profile 109, one (or more) of whom are 'converted' ahead of the other attracted suitable profiles.

The processing module 105 is set so that individual talent profiles 107 that the member organisation doesn't or can't convert on are automatically and privately matched to any future or new curated job profiles within the larger talent community. These are referred to herein as secondary job profiles 109b, 109c, etc, with the initial profile referred to as the primary job profile 109a.

If the owner of a talent profile 107 is hired by another organisation based on matching their profile 107 to a secondary job profile 109b, 109c, this is registered by the processing module 105. The processing module 105 will then provide revenue or remuneration back towards the original member organisation which created the original profile that attracted the subsequently converted individual talent profiles 107. In this manner, an organisation that has spent time and effort to attract the largest pool of suitable talent possible for a particular role or roles can capitalise on the secondary attracted talent which the initial attracting organisation itself cannot 'convert', helping to ensure that the effort spent to attract this talent is not wasted and can be at least partly recouped.

Figure 2:
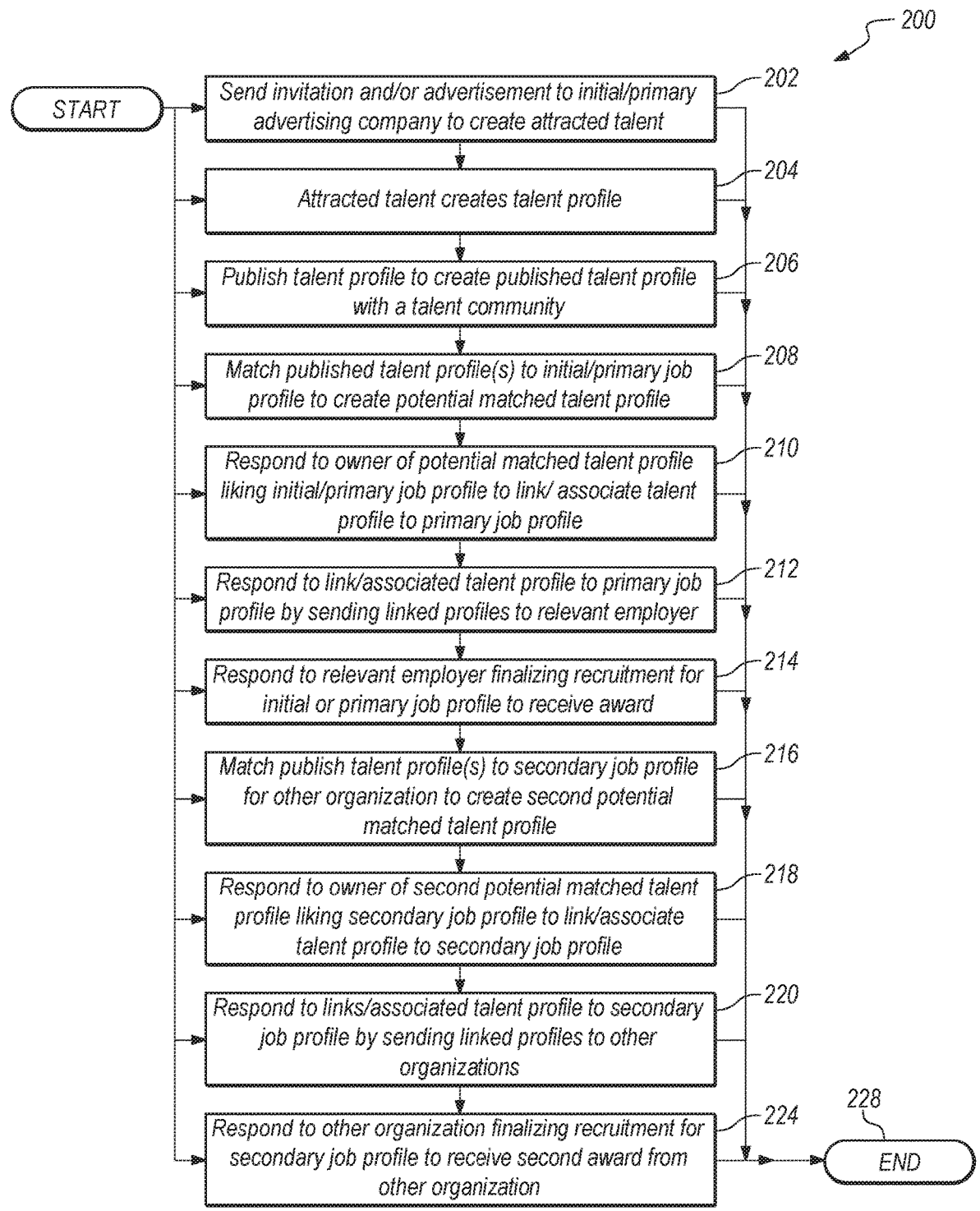
FIG. 2 shows a schematic overview flow diagram of a method of capitalizing on secondary attracted talent during a recruitment process according to an embodiment of the present invention, the method implemented within a computer system.

In step 4, the process is illustrated in FIG. 2.

FIG. 2 shows a schematic overview flow diagram of a method of capitalizing on secondary attracted talent during a recruitment process according to an embodiment of the present invention, the method implemented within a computer system.

At 202, invitation/advertisements are sent by an initial or primary advertising company 108a in order to attract talent into the talent community 111.

At 204, talent profiles 107 are created by attracted talent/users and at 206, the talent profiles 107 are published within the talent community 111.

At 208, the talent profiles 107 are matched to initial or primary job profiles 109a, for the initial or primary advertising company 108a, by the processing module 105.

At 210, the owner of a talent profile 107 clicks 'thumbs up' or 'like' to show that they are interested in a particular profile (a primary job profile 109a). This is registered by the processing module 105 as 'profile liked', or similar. In this manner, the talent profile 107 is associated or linked to a primary job profile 109a.

(v) If the owner of a talent profile 107 is not interested in a profile (does not 'thumbs up', or 'like' a profile, their details are retained within the network and are matched to secondary job profiles as outlined in step (vii) below, and/or are retained in the database and matched to new job profiles as these are created.

(vi) The relevant information relating to the owner of the talent profile 107 that has 'liked' a job profile will be sent to the relevant employer member 108.

(vii) The employer member 108 (primary advertising company 108a) finalises the recruitment process by contacting the individual owners of a suitable and matched profile 107, carrying out interviews, and (if applicable) making employment offers. The employer member 108 pays a finder's fee to the owner of the talent recruitment system 1 on completion of the process—once an offer of employment has been accepted.

(viii) The talent profiles 107 are also matched with secondary job profiles 109b, 109c, etc owned by other organisations 108b, 108c, etc, based on pre-determined criteria, by the processing module 105.

(ix) If a talent profile 107 is not selected for a particular employer member opportunity or vacancy 109 (a primary vacancy 109a), the talent profile 107 is then shown every job profile 109 that they are matched to in the talent community (secondary job profiles 109b, 109c, etc). The talent 'thumbs up', or 'likes' different secondary job profiles 109b, 109c, etc. of interest. In this manner, the talent profile 107 is associated or linked to the secondary job profile or profiles 109b (or 109c, 109d, etc).

(x) In a similar manner to steps (vi) and (vii) above, the relevant information relating to the owner of the talent profile 107 that has 'liked' a job profile will be sent to the relevant employer member 108b (or 108c, 108d, etc). The secondary employer member 108b finalises the recruitment process by contacting the individual owner(s) of suitable and matched profile(s) 107, carrying out interviews, and (if applicable) making employment offers. If the individual who owns the talent profile 107 is hired by the secondary organisation (that is, the process is 'completed'), as a consequence of this, the owner of the talent recruitment system 1 receives a secondary referral award or fee or secondary finder's fee from the secondary organisation.

Another advantage of the present invention is that, in a further embodiment, the individual who owns talent profile 107 (as well as other potential candidates) can also be the owner of the talent recruitment system 1; that is, the talent profile 107 owner can share a job profile (e.g. via a clickable link) with friends, other colleagues etc. that are potential candidates for the job. Consequently, if a candidate is hired based on the referral by the owner of talent profile 107, then a secondary referral award (or fee) or secondary finder's award (or fee) is also provided to the owner of talent profile 107 (or to the person or entity that referred the candidate).

(xi) The employer member 108a (the primary member) who attracted the talent into the community 111 is paid a portion of the secondary referral fee by the system owner.

That is, in steps (x) and (xi), if the employer member 108 who ultimately employs a talent profile 107 is not the primary attractor of the employed talent (i.e. the now-employed talent profile 107 was attracted into the pool by advertisement/link/invitation from member 108a, but was subsequently matched with a secondary profile 109b or 109c owned by organisation 108b or 108c), then the secondary organisation 109b/109c pays the finder's fees to the owner of the talent recruitment system 1, who shares this fee with the initial attracting employer member 108a that originally brought the talent into the community.

In step (i) above, the invitation/advertisements sent by the primary company 108a are either direct messages, e-mails, or advertisements (online or print) that include a link or an address to the talent pool. These can be referred to collectively as electronic advertising from within the talent pool (although print advertisements are not directly 'electronic', the aim is to use these as a first step, with respondents entering the website address or similar that is provided with the advertisement in order to continue/complete the process). In this way, new members are attracted into the pool who may not already be members, and the overall size of the talent pool is grown.

Variations

The processing module 105 can also be set to send alerts to individual profile owners if a job profile is created at a future date or time by a member organisation. Profiles can also be favourite listed or bookmarked, and the processing module 105 can also be set to create an alert if a new profile that matches relevant pre-set criteria is created, or if an existing profile changes to match relevant pre-set criteria.

The processing module 105 is also configured to track the activities of individual talent profiles within the talent recruitment server 101 as follows: the job profiles 109 within the data store 102 are trackable. Each time a talent profile 107 shows interest in a job profile 109 by viewing the trackable job profile 109 (by clicking through from a higher-level page onto the detailed job profile 109 or organisation profile 108, this is logged by the processing module 105.

The processing module 105 provides a referral token or receipt 110 to the member organisation who attracted the talent profile 107 (i.e. the trackable job profile 109 attracts a click-through, which triggers the processing module 105 to provide a referral token 110 to the organisation who created or which owns the profile). A receipt is provided for each individual view—i.e. one receipt or token per view unique individual talent profile view. That is, multiple views by the same individual talent profile achieve one token, not multiple tokens.

Other variations are also possible. For example, a job or vacancy profile 109 might attract a large number of profile click-throughs or 'likes', but a high proportion of these may be candidates who are entirely unsuited or are not at all a close match for the requirements of the particular vacancy.

The individual profiles which click through on any particular vacancy could be weighted against the requirements, so that rather than a referral token of fixed-value being provided, the value of the token varies depending on the quality of the profile of the individual user who has clicked-through. Profiles that are a close match for the requirements are assessed by the processing module 105 as having a higher value than those of individuals who are not a close match and who are unlikely to be seriously considered for the role.

In this variation, the eventual reward or remuneration provided to the owner of the original vacancy profile 109 will depend largely on the closeness of the attracted matches. The successful placement of a 'close fit' or 'close match' candidate in a secondary organisation where their requirements are substantially the same or very similar to those of the original organisation will provide greater reward than the successful placement of a candidate in a secondary organisation who is/was not a close match, or where the requirements of the secondary organisation were dissimilar to those of the original primary organisation.

The talent profiles 107 are matched to initial or primary job profiles 109a, for the initial or primary advertising company 108a, by the processing module 105.

(iv) The owner of a talent profile 107 clicks 'thumbs up' or 'like' to show that they are interested in a particular profile (a primary job profile 109a). This is registered by the processing module 105 as 'profile liked', or similar. In this manner, the talent profile 107 is associated or linked to a primary job profile 109a.

(v) If the owner of a talent profile 107 is not interested in a profile (does not 'thumbs up', or 'like' a profile, their details are retained within the network and are matched to secondary job profiles as outlined in step (vii) below, and/or are retained in the database and matched to new job profiles as these are created.

In another embodiment, processing module 105, for example, may use vacancy profile information to create a vacancy profile that corresponds to a first vacant position to be filled. Upon receipt of candidate profile information from a candidate, processing module 105 uses the candidate profile information to create a candidate profile for the first vacant position.

In one embodiment, the candidate profile information might include, for example, personal information of the candidate. Processing module 105 can then employ a matching or other suitable algorithms to determine whether the candidate profile and the vacancy profile are matching. The matching may be weighted; a threshold level for matching attributes may be required; For each attribute that matches, an indicator indicia (e.g. color) may be employed.

If a match between the candidate profile and the vacancy profile exists, a choice request message is generated for delivery to the candidate. The choice request message might for example, present the matching information to the candidate and might request that the candidate provide an indication as to whether the matched vacant position is desirable.

The system of the present invention may also create a secondary database or secondary database network, for which membership is required. Providers or employers may become members. Candidates can also become members of this secondary database network, which includes job vacancy profiles other than the vacancy profile for the first vacant position. Candidates become members by providing member profile information that includes candidate profile information as well as candidate consent information. The candidate consent information authorizes the system to match the member profile with vacancy positions beyond the first vacancy position that the candidate initially applied for. Here, processing module 105 uses the membership profile information to create a member profile for the candidate.

As noted, if a match between the candidate profile and the vacancy profile exists, a choice request message to request whether the vacant position is desirable is generated for delivery to the candidate. If the vacant position is not desirable and the candidate i s a member, the candidate's member profile is stored and processing module 105 matches the member profile to new job profiles as these are created.

In certain embodiments, when matches occur between member profiles and new job profiles, awards may be offered to providers or employers based on their contribution to the secondary database network. The awards may include prizes, points, money or other incentives or compensation. Contributions to the secondary database network may include providing a vacancy profile and membership profiles associated with or created in response to the vacancy profile.

Information within any particular profile might be the basis for operation of an embodiment or for information flow between members of the secondary database network. For example, if a member profile and a vacancy profile has similar attribute, then a choice request message is sent to a candidate. Updating, connecting, viewing information and identifying relationship information between members may also be based on profile information.

Other embodiments—The registering of the linking of a primary talent profile or profiles to the primary job profile may result a representative of the owner of the primary talent profile clicking on an icon or link by operating a second processor. The processor and the second processor may be the same or differ. The results of matching talent profiles within a talent pool to primary and secondary job profiles may be private. The details of the primary talent profile may be available to the owner of a primary job profile once the primary talent profile is linked to the primary job profile. The invention may further automatically match primary talent profiles linked to primary job profiles but non-completed to subsequently created secondary job profiles within the talent community. In the event of the linking of multiple primary talent profiles to a primary job profile, the talent profiles are ranked according to criteria set by the owner of the primary job profile. The owner of the primary job profile may set further filters to rank and/or exclude talent profiles.

Figure 3:
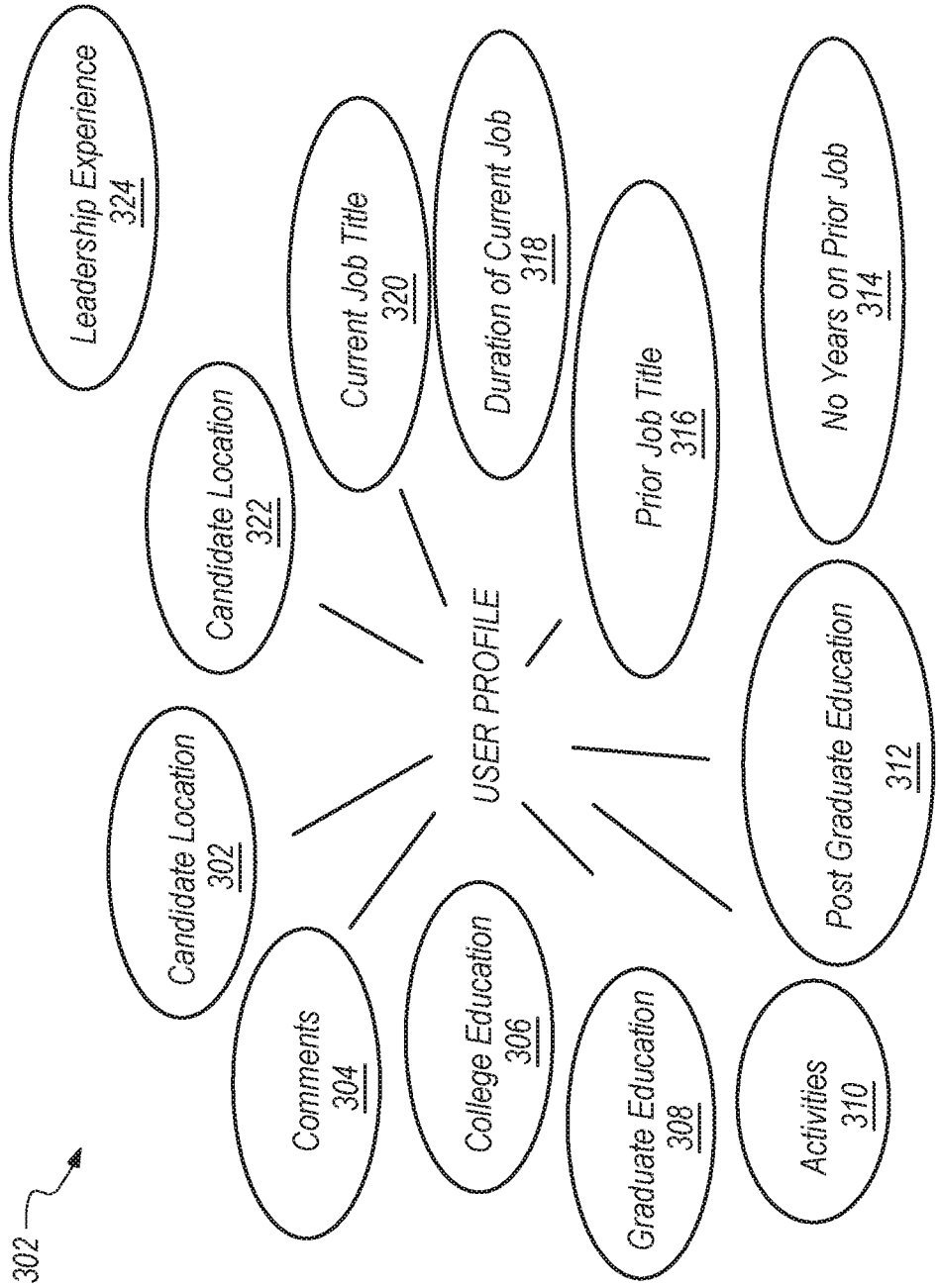
FIG. 3 shows a candidate profile in accordance with an exemplary embodiment of the present invention.

FIG. 3 illustrates a talent profile 107 according to an exemplary embodiment of the present invention.

In FIG. 3, talent profile 107 is an example of data fields stored in a data object in data store 102. Talent profile 107 might include candidate location 302 and comments 304. Comments 304 may include preferences such as location preferences or other comments that a candidate may wish an employer to consider.

Talent profile 107 also includes college education 306, graduate education 304, and activities 310. Activities 310 may include extracurricular activities such as club memberships, interests, and the like.

Talent profile 107 also includes postgraduate education 312, number of years on prior jobs 314, and prior job title 316. Other fields that may be included in talent profile 107 include duration of current job 318, current job title 320, candidate name 322, and leadership experience 324.

Figure 4:
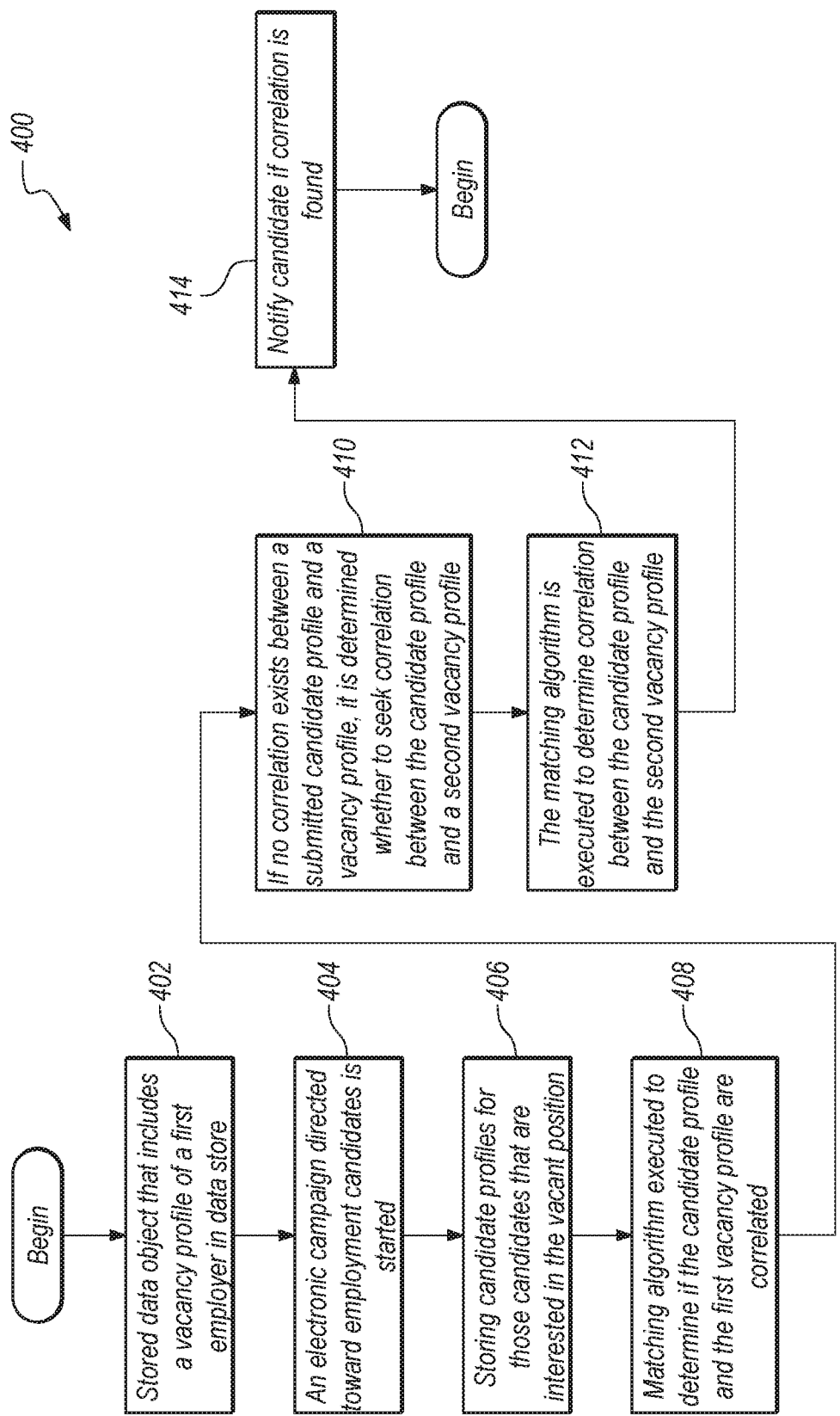
FIG. 4 illustrates a talent recruitment method according to an exemplary embodiment of the present invention.

FIG. 4 illustrates a talent recruitment method 400 according to an exemplary embodiment of the present invention.

In FIG. 4, method 400 might be implemented on talent recruitment system architecture 1 including talent recruitment server 101 in conjunction with one or more terminals 106. Terminal 106 may include a user device such as a mobile device, tablet, desktop, for example, having a browser thereon.

Talent recruitment server 101 might include a web server that hosts a website and TR (Talent Recruitment) application 105 to implement the precepts and concepts of the present invention. The application can respond to browser based software on terminal 106 and might be based on PHP and MySQL; the application can process variables, data types, functions and HTML objects such as forms.

At step 402, method 400 involves the storage of a data object that includes a vacancy profile of a first employer in data store 102. Such a first employer might be any entity, company, corporation or the like that typically expends resources to conduct a search and identify a suitable candidate for a vacant position within the company. The first employer may independently conduct the search itself or might engage a search firm to conduct the search.

Regardless, considerable cost and resources are expended to locate a suitable candidate. In one embodiment, the result of the search may identify a candidate that is not necessarily seeking employment (i.e., not on the job market) but is uniquely qualified for the vacant position as further discussed below. An exemplary vacancy profile stored as a data object will now be discussed with reference to FIG. 5.

Figure 5:
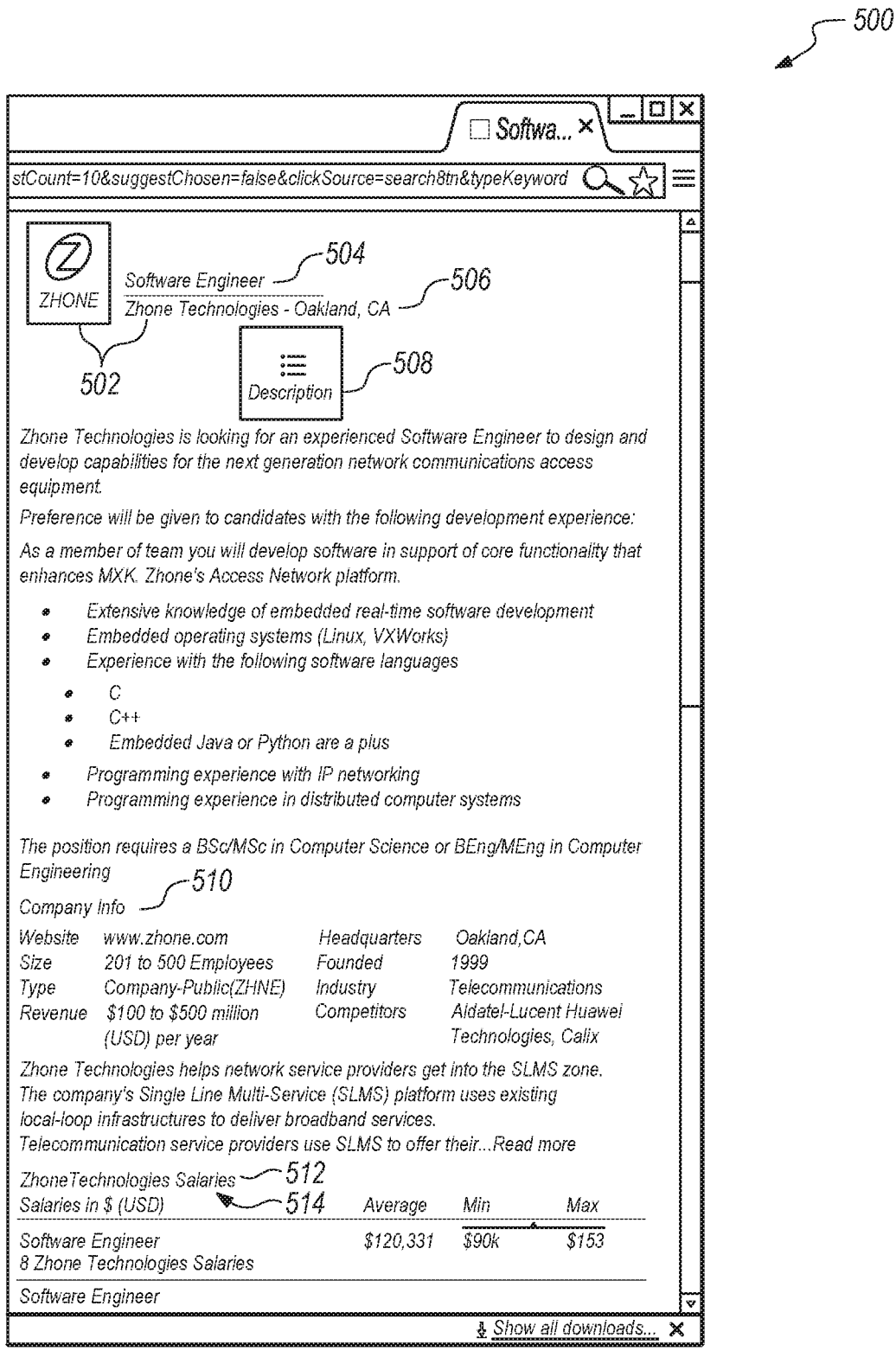
FIG. 5 illustrates a vacancy profile for a vacant position that may be stored as a data object such as an XML file (for example) according to an exemplary embodiment of the present invention.

FIG. 5 illustrates vacancy profile 500 of a vacant position that may be stored as a data object such as an XML file (for example) according to an exemplary embodiment of the present invention.

In FIG. 5, vacancy profile 500 shows the job attributes as well as the candidate attributes needed to qualify for the vacant position. In this example, vacancy profile 500 is created for an employer Zhone Technologies as shown at 502. Zhone Technologies is seeking a software engineer as shown at 504. The location for the position is in Oakland Calif. as shown at 506.

The job description for the software engineer is shown at 508. According to the description, preference will be given to candidates with experience in C, C++ and Java or Python. In an embodiment, the present invention can rank candidates, thus, a candidate that has only C experience is ranked higher than candidates without C experience. However, a candidate for the Zhone Technologies position with all of the preferred software experience i.e., C, C++ and Java is ranked higher than candidates with only C experience.

In FIG. 5, vacancy profile 500 also includes company information namely the company URL, number of employees, revenue, etc. The profile also includes salary information for the job, here, $120,331.00. Once entered, all of this information is then saved as a data object.

In one embodiment, the first vacancy profile may include or be associated with a track-able link that digitally tags an employment seeker. As an example, a track-able link 514 may be associated with the word "Salaries" such that selection of the link by a user (e.g., to obtain more information on salaries) attaches a parameter to the URL associated with track-able link 514 in order to track candidates that create profiles (or the corresponding campaign clicked by the candidate).

Referring now to FIG. 4, after a vacancy profile of the first employer has been stored, at step 404 of method 400, an electronic campaign directed toward employment candidates is started. The electronic campaign is directed to one or more employment candidates. The electronic campaign may comprise various forms of communication. As an example, the electronic campaign may be an electronic ad campaign. Here, electronic ads highlighting a vacancy profile may be displayed to potential employment candidates at jobsites or other popular forums such as social media websites including Facebook, LinkedIn, etc. A potential candidate that is interested in the vacancy profile may select the ad (or track-able link) and be directed to the talent recruitment system website, where the user can create a candidate profile.

One skilled in the art will realize that other electronic campaign types may be utilized. The electronic campaign may also be an email campaign for example. Specifically, the electronic campaign may be e-mails that are sent out to many potential candidates. Alternative, the email campaign might be targeted toward specific identified potential candidates that are then invited to apply for the vacant position. In such a case, the employer may obtain (from public or private sources), the profiles and contact information of specific individuals that might match the employer's vacancy profile.

Potential candidates may be identified via research on LinkedIn, public resume banks, Facebook, and other sources. In fact, such potential candidates may be currently employed and may not be seeking new employment. Thus, such identified candidates would not otherwise be identifiable by other employers with vacant positions since they are not on the job market. Identification of such candidates requires that considerable time, effort and resources be expended by the employer.

At step 406, after the electronic campaign is initiated, method 400 receives and stores candidate profiles for those candidates that are interested in the vacant position. Upon receiving a solicitation or upon encountering a website with the vacancy profile, an interested potential candidate responds by filling out or submitting a candidate profile that is stored as a data object in data store 102. The information contained in the candidate profile therein may also be submitted via a data object such as a text file.

A number of candidate profiles representing potential candidates that are interested in the first employer's vacancy profile will now be illustrated.

FIG. 6 illustrates candidate profile 600 that may be stored as a data object according to an exemplary embodiment of the present invention.

In FIG. 6, candidate profile 600 includes all of a candidate's attributes and compensation desired (not shown). Here, candidate profile 600 is for a candidate named John J. Johnson as shown at 602. John is located in Menlo Park, Calif. as shown at 604. John's data also shows his experience 606, education 612 and interests 618. John's experience 606 includes working at Facebook, Inc. 608 in Menlo Park, Calif. as a software engineer 609 for four years.

John has coding experience in C++, HTML and PhP as shown as 610. John's education 612 was at Stanford University 614 where he graduated with a BS in Electrical Engineering 616. His interests include serving as a Youth Tennis Association board member 620. The candidate profile data may be entered and uploaded by the user as either a text file as part of a resume, a PDF file, or the like. The user may also enter this information via data object such as a HTML form which receives all of the information and creates a talent profile for the user.

FIG. 7 illustrates candidate profile 700 that may be stored as a data object according to an exemplary embodiment of the present invention.

In FIG. 7, candidate profile 700 includes all of the candidate's attributes and compensation desired (not shown). Here, candidate profile 700 is for a candidate named Jane D. Doe as shown at 702. Jane is located in San Francisco, Calif. as shown at 704. Jane's data also shows her experience 706, education 712 and interests 718. Jane's experience 706 includes working at Twitter, Inc. 708 in Menlo Park, Calif. as a software engineer 709 for nine years. Jane has coding experience in C, C++, Java as shown as 710. Jane's education 712 was at San Francisco State University 714 where she graduated with a BS in Computer Science 716. Her interests include serving as a member of the Computing Internet of Things Club 720.

FIG. 8 candidate profile 800 that may be stored as a data object according to an exemplary embodiment of the present invention.

In FIG. 8, candidate profile 800 includes all of the candidate's attributes and compensation desired (not shown). Here, candidate profile 800 is for a candidate named Dave D. Davidson as shown at 802. Dave is located in New York, N.Y. as shown at 804. Dave's data also shows his experience 806, education 812 and interests 818. Dave's experience 806 includes working at Computing, Inc. in New York as a software engineer 809 for five years.

Dave has coding experience in PhP, C, C++, Java, AJAX, HTML, Ruby and XML as shown as 810. Dave's education 812 was at Columbia University 814 where he graduated with a BS in Electrical Engineering 816. His interests include being a member of the Cryptography Club 820.

Referring now to method 400 of FIG. 4, after a candidate profile is created and stored, at step 408, a matching algorithm is executed to determine if the candidate profile and the first vacancy profile of the first employer are correlated. The matching algorithm uses cluster attribution matching and ranking protocols to rank the order of candidate applicants for a position.

Therefore, typically, an employer that receives hundreds of resumes for a vacant position is inundated and must sift through such hundreds of profiles to identify the right applicant. An advantage of the present embodiment is that it can educate candidates as to how their profiles align/match to opportunities which hold the highest holistic value (i.e. where both the end users (seekers and employers) are aligned by complementary dynamics and value proposition.

Profiles from data sets are created to capture broad stroke correlation criteria in the areas of: location, industry, company name, title, skill set/expertise, language, and education, for example. The system then automates the matching, ranking and attribution of value from each data point through the correlation of predetermined relationships between multiple quantities (variables) in which they vary together. Matches are attributed to a value or score in which positive correlation exists where the high values of these variables are associated with the high values of the other variable(s). Automated regression analysis highlights direct relationships between the above broad matching criteria.

The system's algorithm utilizes a framework in which matches are structured by pre-set dynamics and value propositions. Example: a candidate profile from a large company with 10 years experience will be matched to C Level titled job profiles of small to medium sized companies/job profiles. The framework follows algorithmic rules in which value propositions and dynamics align with where candidate and job profiles dynamics/value propositions make business case rationale.

Referring to FIGS. 6, 7 and 8, in one embodiment, the method and system of the present invention ranks and matches profiles 600, 700 and 800 to opportunities that are segmented by small, medium or large organizations within correlated locations, here, Oakland, Calif. (San Francisco Bay Area or Northern California) where the employer Zhone Technologies is located (segmentation may by based on the location of candidates as well). Based on such segmentation, Dave's profile 800 (see FIG. 8) would be weighted low or would not be matched at all because Dave is in NY outside of the San Francisco Bay Area. Contra-wise, John's profile 600 (see FIG. 6) and Jane's profile 700 (see FIG. 7) would be weighted and ranked.

The system may also rank profiles by correlated industries. Here, all of profiles 600, 700 and 800 are within the software development industry, so they would all be weighted equally and ranked. The system further segments by titles. Here, John is a software engineer as shown at 609, Jane is a software engineer as shown at 709 and Dave is a software engineer as shown at 809 (FIG. 9). So, all of the profiles would qualify for weighting and ranking based on title segmentation.

The system further segments based on skill set. Here, Dave receives the highest weighting and ranking as Dave's skills include C, C++, Java and Python as required by vacancy profile 500 (FIG. 5). Jane's skill would be ranked below Dave's as Jane has some of the required skill set namely C, C++, Java as shown at 710 (see FIG. 7). Here, John receives the lowest weighting and ranking as he has only C++ of the required skill set as shown at 610 (see FIG. 6).

The system may also segment based on correlated education. Here, Jane has a BS in Computer Science as shown at 716 (see FIG. 7), and each of Dave and John has a BS in Electrical Engineering. However, since the vacancy profile 500 is silent about the type of educational requirement, all of the candidates would be weighted and ranked equally. Overall, the system would select Jane Doe as a match and the ranking order would be Jane J. Doe ($1^{st}$) John J. Johnson ($2^{nd}$). Dave D. Davidson would either be $3^{rd}$ or receive no ranking at all because he is outside the correlated location area.

At step 410 of method 400 (FIG. 4), if no correlation exists between a submitted candidate profile and a vacancy profile, it is determined whether to seek correlation between the candidate profile and a second vacancy profile from another employer. For example, if Dave's profile 800 does not correlate with the Zhone profile 500, it is determined whether the Dave's profile 800 should be correlated with a secondary profile from another employer.

Therefore, an advantage of the present invention is that it provides other employers with access to candidates that such employers would otherwise have no access to. Typically, the other employer is another entity, company, corporation, association or the like that is separate from the first employer to which the candidate profile is submitted. For example, the first employer may be Zhone, Inc. while the second employer may be Twitter, Inc. In a traditional system, the second employer would have no access to the interested potential candidate that has submitted a profile to a first employer since the submitted profiles are not open to other employers.

This lack of access is particularly true when, in one embodiment, the first employer expends effort, time and resources to identify candidates that are not on the market but are a potential match for the first employer's vacant profile. Thus, unlike candidates that are looking for employment and will submit their resumes to many employers, in one implementation, the potential candidates identified by the first employer are not seeking employment opportunities and thus a second employer would have no access to them, unless such access is provided herein by the first employer via the present embodiment.

Another advantage is that candidates can now access or be matched to secondary employer profiles beyond the primary vacant profile for which the candidate profiles are submitted. Candidates need not search multiple employer websites or multiple recruiting websites, submitting resumes on from website to website until they become exhausted while hoping find vacancy profiles that they are aligned with.

Referring now to FIG. 4, the determination of whether to seek correlation between the candidate profile and a second vacancy profile from another employer may be based on consent received from the candidate. As illustrated in FIGS. 6-8, a candidate can select whether to authorize correlation with other secondary bases as shown at 622 (FIG. 6).

If the candidate selects "Yes," a flag is set to indicate that the system should search other secondary bases if there is no match between the candidate's profile and the first employer's vacancy profile. If the candidate selects "No," no flag is set.

A person that is skilled in the art will realize that other methods for determining whether the candidate wishes to search secondary databases can be employed. For example, a routine or subroutine may generate an electronic mail that is sent to candidates after they submit their profiles to the system. The emails may request candidate consent to search secondary databases and responsive thereof candidates can provide the requisite consent by responding to the electronic mail. As used here, the secondary database is any database in which a second employer profile is located.

In FIG. 4, at step 412, if no match exists between the candidate's profile and it confirmed that the candidate authorizes a secondary database search, the matching algorithm is executed to determine correlation between the candidate profile and the second vacancy profile. At step 414, if a correlation is found, the candidate is automatically notified that a match has been found between the candidate's profile and a secondary profile from another employer. As an example, Dave's profile 800 may match not match the Zhone Technologies profile 500, however, his profile may be correlated with that of another employer profile. In that case, a notification is automatically sent to Dave@gmail.com that notifies Dave that a match between his profile and a secondary employer profile has occurred.

In this manner, embodiments of the present invention significantly resolve one or more disadvantages of conventional recruiting systems. It is indisputable that most talent applying for a job do not get hired. However, companies invest substantial amounts per new hire; and this hiring process results in inefficiency and significant wasted resources and investment on talent that companies do not hire. By utilizing talent companies do not hire for a first vacancy position, the present invention addresses inefficiency in today's recruiting landscape through the optimization of conversion capability. Further, by providing rewards, certain embodiments of the present invention provides business justification for further investment in talent attraction and talent management by providing a form of insurance for their human capital investment.

System details

Further details of a system suitable for performing the method described above will now be described in more detail.

The processor of processing module 105 is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The processing module 105 is also configured to be able to sort data and arrange this for visualisation, by utilising the data retrieval module 104 that is in communication with the data storage systems or devices that form the data store 102.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system (for example, the system could be built using Ruby on Rails with Node.js). Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data sorting and visualisation computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

The system or apparatus may include one or more of the following: 1) a processor, 2) an installation mechanism, 3) a system interface and/or 4) a client interface. The method may include an operating and/or using any of the processor, the installation mechanism, the system interface and/or the client interface to capitalize on secondary attracted talent during a recruitment process.

A processor may include a computer and/or at least one finite state machine. The computer may include a data processor and an instruction processor with the data processors instructed by the instruction processor for use by one or more steps of the method's of operating and/or using the processor.

A finite state machine receives an input, may maintain and/or update one state and generates an output based upon one value of the input and/or the states. The installation mechanism may be configured, used and/or operated to interact with one of the processor(s), systems interface(s)

and/or client interface(s) to configure the interacting processor, systems interface and/or client interface in accord with an aspect of this invention.

The configuration may be an installation package received and stored for a time by the processor, system interface and/or client interface. The installation package may alter a program system residing in a memory adapted to instruct the computer and/or alter programmable logic device(s) to operate the finite state machine. The programmable logic devices may include Field Programmable Gate Arrays (FPGAs) and/or programmable controllers. The installation mechanism may include implementations using a non-volatile memory to retain the installation package and/or a server to deliver the installation package.

The system interface may include a processor configured to support the recruitment process. The recruitment process may further be configured for access as a web site possibly further configured for password protected access.

The client interface may include a processor configured to interact with the system interface and/or one or more of the previously mentioned processors. The client interface may be directed by a user activating the password protected access to capitalize on the secondary attracted talent during the recruitment process.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device.

The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/figures should be considered only as exemplary, and not limiting, unless otherwise specifically noted.

Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

While the above is a complete description of exemplary specific embodiments of the invention, additional embodiments are also possible. Thus, the above description should not be taken as limiting the scope of the invention, which is defined by the appended claims along with their full scope of equivalents.

I claim:
1. A computer implemented method comprising
by one or more servers, generating for storage in a data store, a plurality of data objects, a plurality of vacancy profiles, and a plurality of trackable links, each data object being associated with a vacancy profile, each profile being associated with an opportunity provider, each data object and associated vacancy profile being inaccessible via a search by another opportunity provider not associated with that data object, each of the plurality of vacancy profiles including a trackable link that tags an opportunity seeker;
by the one or more servers, initiating an electronic campaign from a primary opportunity provider directed to a plurality of opportunity seekers identified as potential matches for a first vacancy profile of the primary opportunity provider;
by the one or more servers, generating and storing in the data store, based on a response by the opportunity seekers to the electronic campaign, candidate profiles for the opportunity seekers, the candidate profiles forming a pool of candidate profiles for the primary opportunity provider, wherein each candidate profile includes a tracking parameter that tags the candidate profile as originating from or associated with the pool of candidate profiles of the primary opportunity provider, the tracking parameter being associated with the trackable link selectable by the opportunity seekers;

by the one or more servers, determining whether a candidate profile in the pool of candidate profiles and the first vacancy profile of the primary opportunity provider are matched, and wherein if at least one candidate profile and the first vacancy profile are matched, retaining the matched candidate for the primary opportunity provider and designating the non-selected candidate profiles for matching with a secondary opportunity provider;

by the one or more servers, determining whether to seek matching between a non-selected candidate profile from the pool of candidate profiles of the primary opportunity provider and a second vacancy profile from the secondary opportunity provider, wherein said determination is based on whether a consent flag associated with the non-selected candidate profile is set, wherein the secondary opportunity provider is an entity that is different from the primary opportunity provider and that would otherwise have no access to the candidate profiles;

by one or more servers, if it is determined to seek matching between the non-selected candidate profile and the second vacancy profile, providing the secondary opportunity provider with access to the non-selected candidate profile and determining a match between the non-selected candidate profile and the second vacancy profile;

by one or more servers, if a match is found, notifying the opportunity seeker associated with the non-selected candidate profile that although a match does not exist between the non-selected candidate profile and the first vacancy profile, that a match exists between the non-selected candidate profile and the second vacancy profile; and by one or more servers, providing an award from the secondary opportunity provider to the primary opportunity provider that attracted the opportunity seeker associated with the non-selected candidate profile, wherein the trackable link is to tag the primary opportunity provider by generating a referral token for the primary opportunity provider when the trackable link is selected by a candidate.

2. The method of claim 1 wherein said consent is received via an electronic message.

3. The method of claim 1 further comprising:
by the one or more servers, generating and storing based on a response by the secondary opportunity seeker to the electronic campaign, a second candidate profile that is associated with said second opportunity seeker;
by the one or more servers determining if the second candidate profile and the first vacancy profile are matched; and, wherein, if not matched, determining whether to match the second candidate profile and the second vacancy profile;
by the one or more servers, if consent to match the second candidate profile and the second vacancy profile is granted, matching the second candidate profile and the second vacancy profile; and
by the one or more servers, ranking each of the first candidate profile and the second candidate profile, based on a level of matching that the first candidate profile and the second candidate profile have with the second vacancy profile.

4. The method of claim 1 further comprising:
by the one or more servers, generating and storing based on a response by a second opportunity seeker to the electronic campaign, a second candidate profile that is associated with said second opportunity seeker;
by the one or more servers determining that the second candidate profile and the first vacancy profile are matched, and, the first candidate profile and the first vacancy profile are matched; and
ranking each of the first candidate profile and the second candidate profile based on a level of matching that the first candidate profile and the second candidate profile have with the first vacancy profile.

5. A computer system comprising:
a memory device; and
a processor in communication with the memory device, wherein the memory device comprises instructions that when executed by the processor cause the processor to:
store a data object that includes a first vacancy profile from a primary opportunity provider, wherein the first vacancy profile includes a trackable link that tags one or more opportunity seekers;
initiate an electronic campaign directed to a plurality of opportunity seekers including at least one candidate identified as potential match for the single vacancy profile;
generate and store, based on a response by the at least one candidate to the electronic campaign, a candidate profile for the at least one potential candidate;
determining if the candidate profile and the first vacancy profile of the primary opportunity provider are matched, and wherein if no matching exists, determine whether to seek matching between the candidate profile and a second vacancy profile that is associated with a secondary opportunity provider, wherein the secondary opportunity provider is an entity that is different from the primary opportunity provider;
if it is determined to seek correlation between the candidate profile and the second vacancy profile, execute the matching algorithm to determine correlation between the candidate profile and the second vacancy profile;
if a correlation is found, notify at least one candidate that although a match does not exist between the candidate profile and the first vacancy profile, that a match exists between the candidate profile and the second vacancy profile; and
provide an award from the secondary opportunity provider to the primary opportunity provider that attracted the opportunity seeker associated with the second vacancy profile, wherein the trackable link is to tag the primary opportunity provider by generating a referral token for the primary opportunity provider when the trackable link is selected by a candidate.

6. The method of claim 5 wherein said determination as to whether to seek matching is based on consent received from the opportunity seeker.

7. The method of claim 6 wherein said consent is received via a flag set in the candidate profile.

8. The method of claim 5 wherein said consent is received via an electronic message.

9. The method of claim 5 wherein the instructions further cause the processor to:
provide the primary opportunity provider with an award based on the match between the candidate profile and the second vacancy profile.

10. The method of claim 5 wherein the instructions further cause the processor to:
- generate and store based on a response by a second opportunity seeker to the electronic campaign, a second candidate profile that is associated with said second opportunity seeker;
- determine if the second candidate profile and the first vacancy profile are matched, and wherein if not matched, determine whether to seek matching between the second candidate profile and the second vacancy profile;
- if matching the second candidate profile and the second vacancy profile is authorized, matching the second candidate profile and the second vacancy profile; and
- if matched, rank each of the first candidate profile and the second candidate profile based on a level of matching that the first candidate profile and the second candidate profile have with the second vacancy profile.

11. The method of claim 5 wherein the instructions further cause the processor to:
- generate and store based on a response by a second opportunity seeker to the electronic campaign, a second candidate profile that is associated with said second opportunity seeker;
- determine matching between the second candidate profile and the first vacancy profile, and between the first candidate profile and the first vacancy profile; and
- rank each of the first candidate profile and the second candidate profile based on a level of matching that the first candidate profile and the second candidate profile have has with the first vacancy profile.

12. A non-transitory computer-readable medium comprising computer-executable instructions for performing a method for quantifying a user's correlation to a suggested profile, the method comprising:

- storing a data object that includes a first vacancy profile from a primary opportunity provider, wherein, the first vacancy profile includes a trackable link that tags one or more opportunity seekers;
- initiating an electronic campaign directed to one or more opportunity seekers including at least one candidate identified as potential match for the single vacancy profile;
- generating and storing, based on a response by the at least one candidate to the electronic campaign, a candidate profile for the at least one potential candidate;
- determining if the candidate profile and the first vacancy profile of the primary opportunity provider are matched, and, wherein, if no matching exists, determining whether to match the candidate profile and a second vacancy profile that is associated with a secondary opportunity provider; wherein, the secondary opportunity provider is an entity that is different from the primary opportunity provider;
- if it is determined to match the candidate profile and the second vacancy profile, matching the candidate profile and the second vacancy profile;
- if a match is found, notifying the at least one candidate that although a match does not exist between the candidate profile and the first vacancy profile, that a match exists between the candidate profile and the second vacancy profile; and
- provide an award from the secondary opportunity provider to the primary opportunity provider that attracted the opportunity seeker associated with the second vacancy profile, wherein the trackable link is to tag the primary opportunity provider by generating a referral token for the primary opportunity provider when the trackable link is selected by a candidate.

* * * * *